United States Patent
Banadaki et al.

(10) Patent No.: US 9,454,583 B1
(45) Date of Patent: *Sep. 27, 2016

(54) ANALYZING USER PROFILES

(71) Applicant: Google Inc., Mountain View, CA (US)

(72) Inventors: Seyed Vahab Mirrokni Banadaki, New York, NY (US); Kumar Mayur Thakur, West Orange, NJ (US); Harishabd Singh Khalsa, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,874

(22) Filed: May 15, 2015

Related U.S. Application Data

(63) Continuation of application No. 13/605,907, filed on Sep. 6, 2012, now Pat. No. 9,047,383.

(60) Provisional application No. 61/531,380, filed on Sep. 6, 2011.

(51) Int. Cl.
*G06F 17/30* (2006.01)
*G06Q 50/00* (2012.01)

(52) U.S. Cl.
CPC ..... *G06F 17/3053* (2013.01); *G06F 17/30864* (2013.01); *G06Q 50/01* (2013.01)

(58) Field of Classification Search
None
See application file for complete search history.

(56) References Cited

U.S. PATENT DOCUMENTS

| 8,417,698 | B2 | 4/2013 | Yoo |
| 8,463,764 | B2 | 6/2013 | Fujioka et al. |
| 2008/0114737 | A1 | 5/2008 | Neely et al. |
| 2008/0189169 | A1 | 8/2008 | Turpin et al. |
| 2009/0177754 | A1 | 7/2009 | Brezina et al. |
| 2009/0234716 | A1 | 9/2009 | Mallick et al. |

*Primary Examiner* — Bai D. Vu
(74) *Attorney, Agent, or Firm* — Fish & Richardson P.C.

(57) ABSTRACT

Methods, systems, and apparatus, including computer programs encoded on computer storage media, for analyzing user profiles. One of the methods includes identifying websites with which users of a social networking service have established an affiliation. The method includes filtering the identified websites by removing websites in which a count of users who have established an affiliation with the website exceeds a threshold. The method includes producing a list of valid affiliations for each filtered website, including generating a validity score for each of the established affiliations with the respective filtered website, determining whether each of the established affiliations with the respective filtered website is valid based on the corresponding validity score, and ranking the users who established valid affiliations with the respective website based on the corresponding validity scores. The method also includes providing the list of the valid affiliations ordered by the ranking.

20 Claims, 5 Drawing Sheets

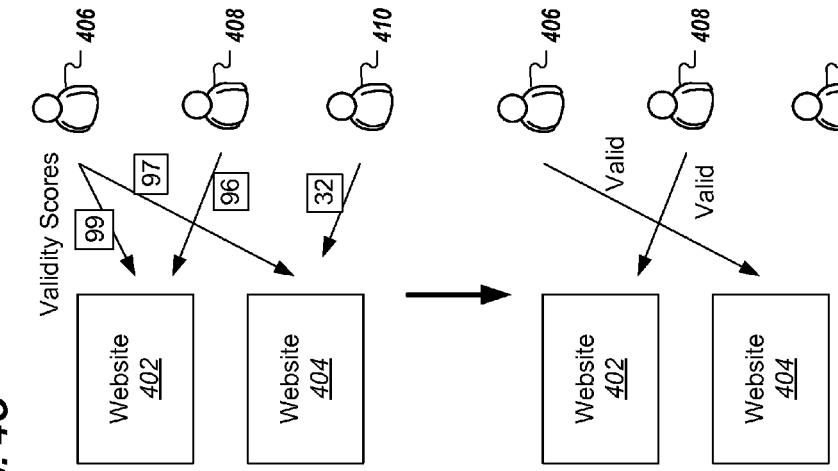
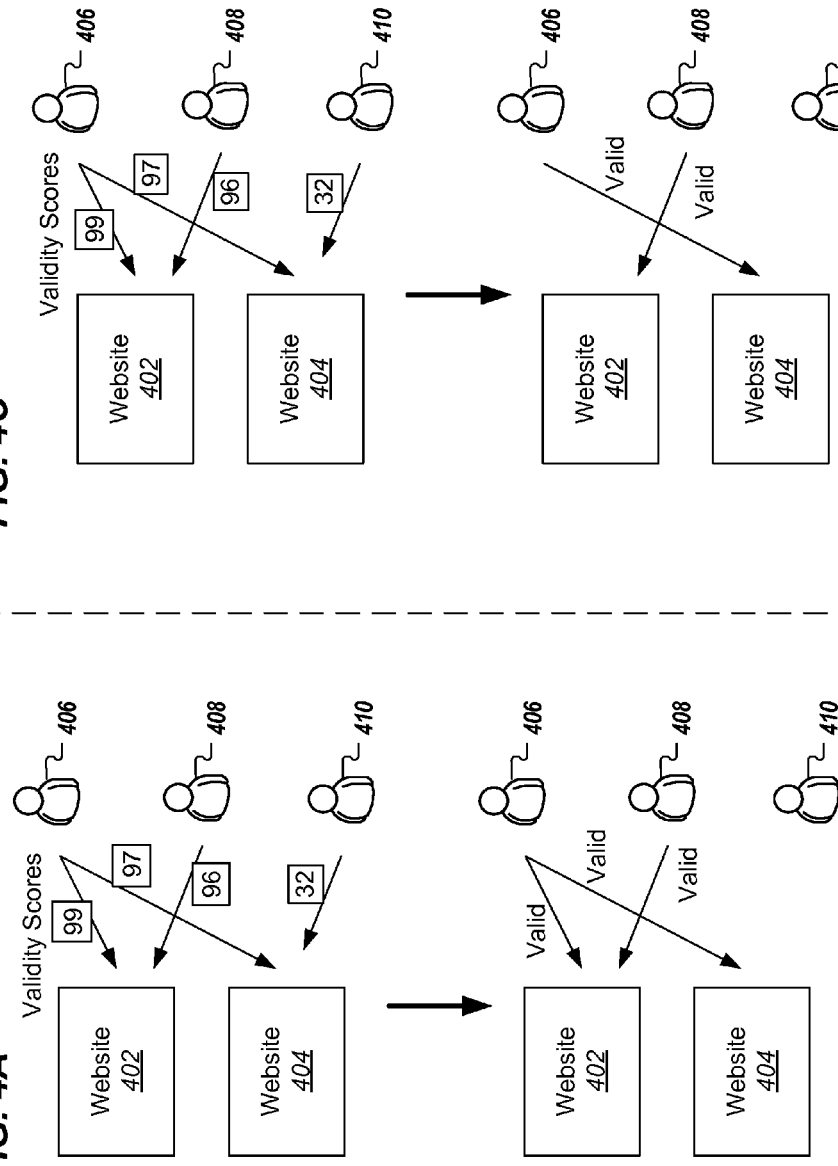

ANALYZING USER PROFILES

CROSS-REFERENCE TO RELATED APPLICATIONS

This application is a continuation of U.S. patent application Ser. No. 13/605,907, filed on Sep. 6, 2012, entitled "Analyzing User Profiles," which claims priority to U.S. Provisional Application Ser. No. 61/531,380, filed on Sep. 6, 2011, entitled "Analyzing User Profiles," the entire contents of which are incorporated by reference herein.

BACKGROUND

This specification relates generally to analyzing user profiles.

Users of social networking services provide various types of information about themselves. For example, social networking service users can have profile pages that describe themselves, for example, details about interests and hobbies. These profile pages can also include websites external to the social networking service that the users feel are relevant to their interests or their online persona or with which they otherwise identify themselves.

SUMMARY

In general, one innovative aspect of the subject matter described in this specification can be embodied in methods that include the actions of identifying websites with which users of a social networking service have established an affiliation. The methods include the actions of filtering the identified websites by removing websites in which a count of users who have established an affiliation with the website exceeds a threshold, the filtering producing a plurality of filtered websites. The methods include the actions of producing a list of valid affiliations for each filtered website, including generating a validity score for each of the established affiliations with the respective filtered website, determining whether each of the established affiliations with the respective filtered website is valid based on the corresponding validity score, and ranking the users who established valid affiliations with the respective website based on the corresponding validity scores. The methods also include the actions of providing the list of the valid affiliations ordered by the ranking.

The foregoing and other embodiments can each optionally include one or more of the following features, alone or in combination identifying the websites may include identifying a link to a website on a profile of a user of the social networking service. Identifying the websites may include identifying link to a website on posts generated by a user of the social networking service. Identifying the websites may include identifying, on at least a portion of a website, information relating to a user of the social networking service. Generating the validity score may include determining a number of times a respective user links to the respective filtered website on a profile of the respective user. Generating the validity score may include determining a number of times a respective user links to the respective filtered website on posts generated by the respective user. Generating the validity score may include determining a ratio of a number of times a respective user links to the respective filtered website compared to a number of times the respective user links to other websites. Generating the validity score may include determining a user quality score, the user quality score based on a popularity of a corresponding user. Generating the validity score may include determining a site quality score. Determining whether the affiliation is valid may include determining whether the user quality score is within a threshold amount of the site quality score.

In general, another innovative aspect of the subject matter described in this specification includes a process for analyzing user profiles. The process includes, among other things, identifying a website with which a user of a social networking service establishes an affiliation; determining at least one validity metric of the affiliation between the user and the website; generating a validity score based on the at least one validity metric; and based on the validity score, determining whether the affiliation between the user and the website is valid.

The process may also include determining a number of users who establish a respective affiliation with the website; and based on the number, determining whether any of the respective affiliations with the website are valid. The process may also include determining none of the affiliations are valid if the number exceeds a threshold number. The process may also include determining all of the affiliations are valid if the number is less than a threshold number.

Determining whether the affiliation is valid can include identifying users of the social networking service who establish a respective affiliation with the website; for each of the respective affiliations, determining respective validity metrics of the respective affiliation between each respective user and the website; generating respective validity scores based on each of the respective validity metrics; and comparing the user's affiliation's validity score with all of the respective validity scores.

Identifying the website can include identifying links to the website on a profile of the user. Identifying the website can also include identifying links to the website on posts generated by the user.

Identifying the website can include identifying, on at least a portion of the website, information relating to the user.

The validity metrics can include a number of times the user links to the website on a profile of the user. The validity metrics can also include a number of times the user links to the website on posts generated by the user. The validity metrics can also include a ratio of a number of times the user links to the website compared to a number of times the user links to other websites. The validity metrics can also include a user quality score, the user quality score based on a popularity of the user. The validity metrics can also include a site quality score.

Determining whether the affiliation is valid can include determining whether the user quality score is within a threshold amount of the site quality score.

The process may also include identifying websites with which a user of a social networking service establishes an affiliation; identifying users of the social networking service who establish an affiliation with a website; determining validity metrics of each affiliation between the users and the websites; generating validity scores based on the validity metrics; and based on the validity scores, matching each affiliated website with a user establishing an affiliation with the matched website.

Matching can include a stable matching technique.

The process may also include identifying websites with which a user of a social networking service establishes an affiliation; identifying users of the social networking service who establish an affiliation with a website; filtering websites by a number of users establishing an affiliation with the website; determining validity metrics for the user affiliations for unfiltered websites; generating validity scores based on the validity metrics for the user affiliations; based on the validity scores, matching an unfiltered website with a user establishing an affiliation with the matched website; based on the validity scores, for each unfiltered website, ranking the users who establish affiliations with the unfiltered website; combining the matching and the ranking to generate combined validity scores for the user affiliations for the unfiltered websites; based on the combined validity score, providing a list of valid affiliations for each website.

Advantages can include detecting and/or suggesting connections between users, for example, users affiliated with a same website. Advantages can also include modifying content presented to users based on website affiliations. Advantages can also include spam detection, for example websites listed on profiles that are spam websites, or profiles created to spam other users. Advantages can also include reducing confusion or misleading information by providing indications to users of invalid claims to websites.

All or part of the systems and processes described herein may be implemented as a computer program product that includes instructions that are stored on one or more non-transitory machine-readable storage media, and that are executable on one or more processing devices. All or part of the systems and processes described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF DRAWINGS

FIGS. 4A-D are examples of analyzing websites represented on user profiles.

DETAILED DESCRIPTION

Figure 1:
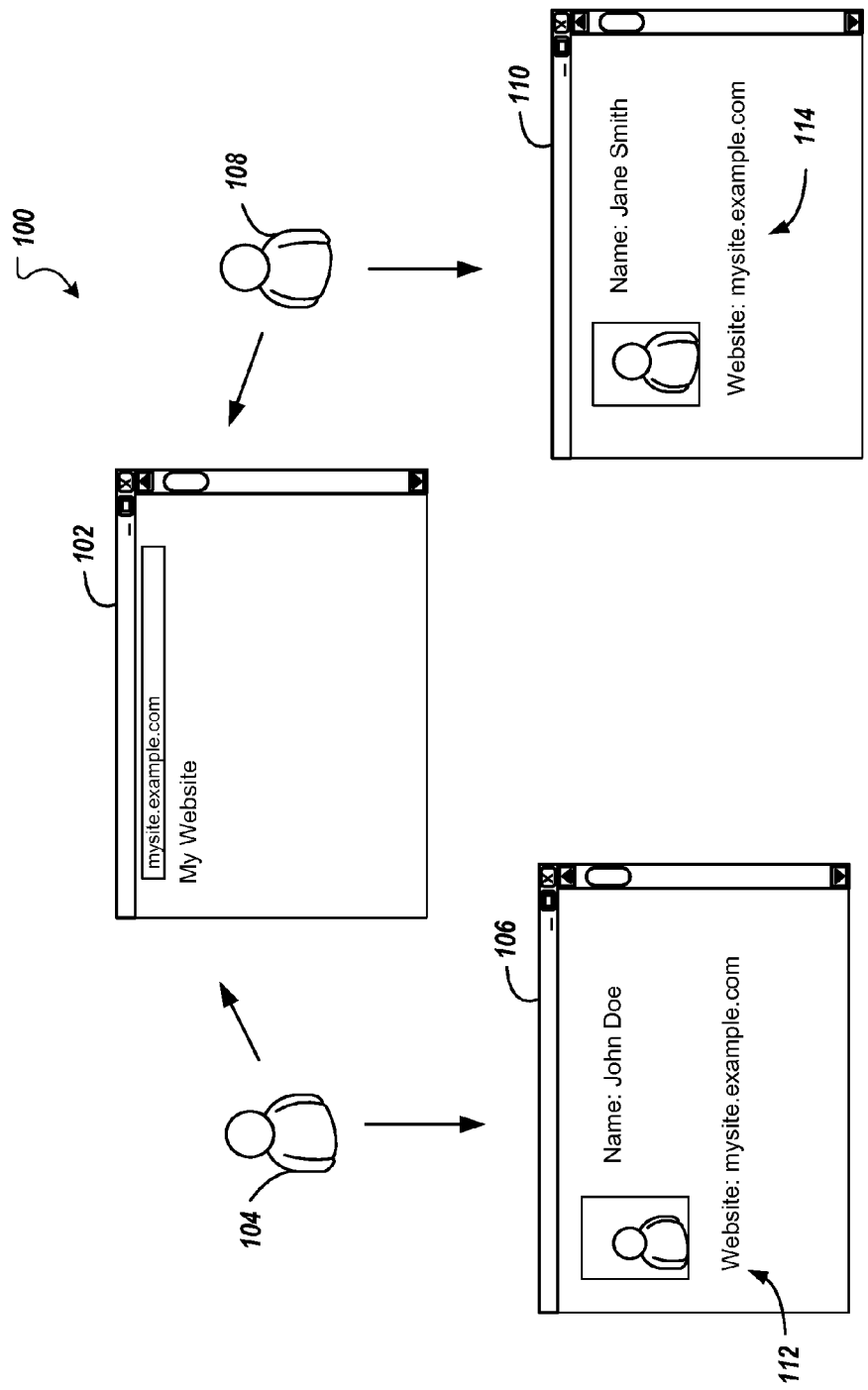
FIG. 1 is a conceptual view of example users affiliating with websites.

FIG. 1 is a conceptual view of example users affiliating with websites. Referring to FIG. 1, two users, for example, John 104 and Jane 108 each have respective user profiles 106, 110 on a social networking service. The user profiles 106, 110 can include information about the respective users, for example the user's name, gender, occupation, school information, hobbies, and other information. The user profiles 106, 110 can also include other information, for example lists of the user's friends and contacts, subscriptions to content, and links to websites and online resources, for example web pages, images, videos, audio files, documents, and other files. For example, as shown in FIG. 1, John 104 and Jane 108 both affiliate themselves with a website 102. The website 102 can be, for example, a website located at http://mysite.example.com. In this example, John 104 provides a link to the website 102 on his profile 106 under a field labeled "website" 112. Thus, John 104 can claim some affiliation to the website 102 http://mysite.example.com. Jane 108 also lists http://mysite.example.com under a website 114 field on her profile 110. Thus, Jane 108 also claims some affiliation to the same website 102.

However, a claim of affiliation by a user may not be valid. For example, for demonstrative purposes, in FIG. 1, Jane's affiliation claim to the website 102 is valid, while John's claim is not considered valid. Affiliation with a website can be defined as a relationship existing between the user and the website, between the user and an owner of the website beyond receiving content, and/or a connection being formed based upon a characteristic, interest, and/or membership of the user. For example, the user can be an owner of the website or an author of the website. As another example, the website can be a website belonging to an organization, for example a company or school, of which the user can be a member.

Figure 2:
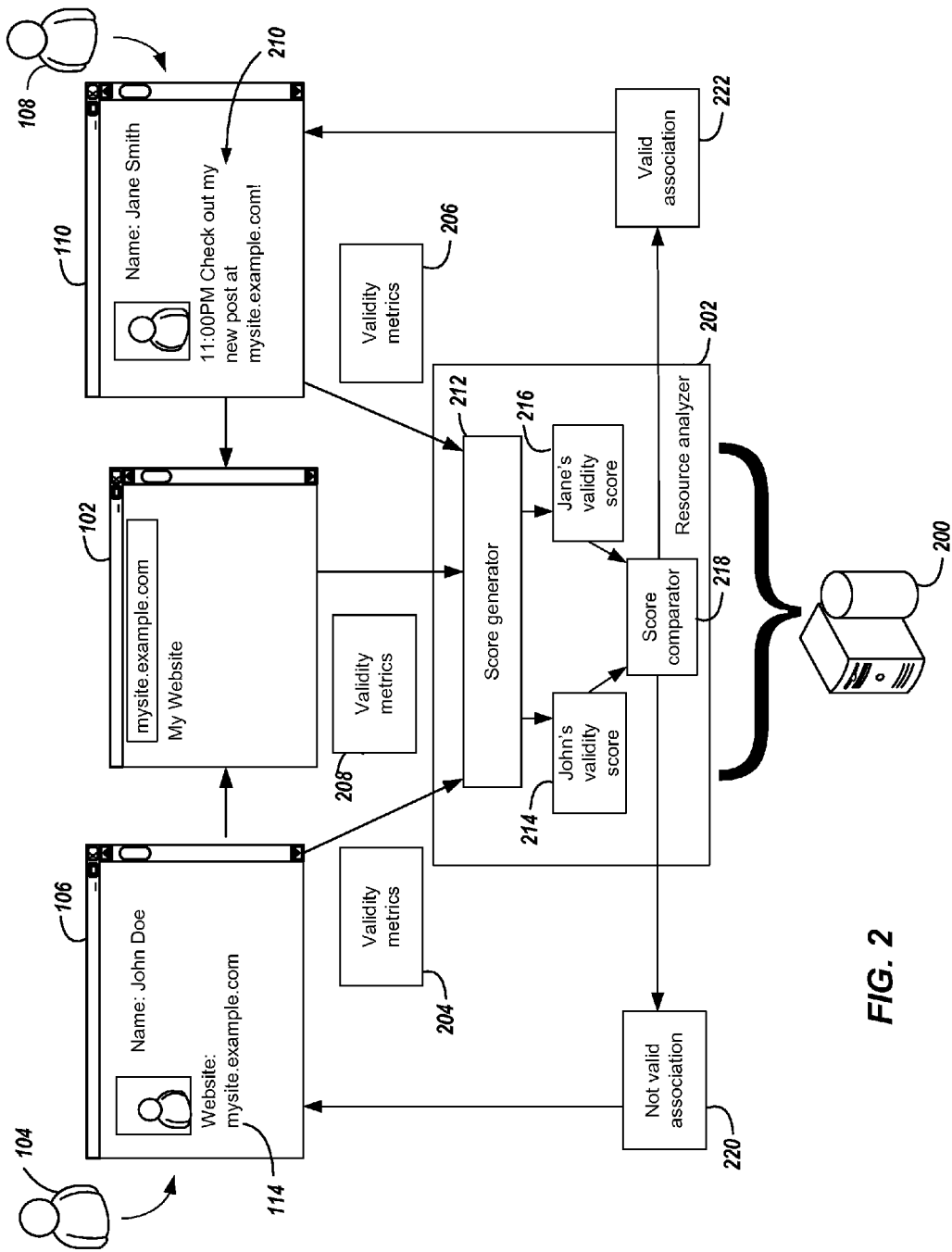
FIG. 2 is a conceptual view of an example data flow for analyzing an affiliated website.

FIG. 2 is a conceptual view of an example data flow for analyzing an affiliated website. Referring to FIG. 2, a server 200 or server system includes a resource analyzer 202. The analyzer 202 can identify websites with which users of a social networking service claim to have an affiliation. For example, the analyzer 202 can identify the website 102 with which John 104 and Jane 108 establish an affiliation. For situations in which the systems and techniques discussed herein collect personal information about users, the users may be provided with an opportunity to opt in/out of programs or features that may collect personal information (e.g., information about a user's preferences or a user's affiliations). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

In some implementations, the engines described herein can be separated, combined or incorporated into a single or combined engine. The engines depicted in the figures are not intended to limit the systems described here to the software architectures shown in the figures.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

The website 102 can be identified in various ways, including identifying links or references to uniform resource locators (URLs) of websites represented on user profile pages. The links can be listed, for example, under the "website" field 114. Additionally, links can also be included in posts generated by users. For example, Jane's profile 110 can include a post 210 written by Jane 108 mentioning the website 102. The posts that include links to websites can also be written by Jane 108 on other users' profiles, for example a post on a profile on a friend of Jane's. The content of the posts can also be analyzed to identify the website 102. For example, a post that uses possessive words (e.g., my, our, mine) with a mention of the website can be determined to more likely be an affiliation claim than a post that mentions a website without such words.

The analyzer 202 can determine validity metrics 204, 206, 208 for each claimed affiliation that provide a measure of a likelihood that a claimed affiliation with a website is valid. The validity metrics 204, 206 can include, for example, how many times the user mentions the website on her profile or her posts. Weights can be assigned to each of the validity metrics 204, 206, for example, a user listing a website on his profile under the website field can receive one weight, while each mention of the website in posts by the user can receive a different weight. A ratio of how often a user mentions the website compared to other websites can also factor into the assigned validity metrics 204, 206. For example, John 104 may have mentioned the website 102 (mysite.example.com) in twenty different posts, compared to Jane 108, who may have mentioned the website 102 in ten different posts. However, if John 104 also mentioned a different site, (for example othersite.example.com) eighty times, while Jane 108 mentioned no other sites on her profile, the validity metrics 206 for Jane's claim of affiliation may increase the weight Jane's mentions of the website 102 to indicate a greater likelihood of the affiliation being valid.

Validity metrics 204, 206 can also include a user quality score for each user. The user quality score can be a score generated based on various factors, including a popularity of the user. In one arrangement, the popularity of the user can be based on how many friends or contacts the user has on friend or contact lists. The popularity of the user can also be based on how many other users include the user on friend or contact lists. The popularity of the user can be included in the validity metrics as a more popular or famous user may be more likely to list valid affiliations, as the validity of the affiliation claim may be verified by many more people.

Validity metrics 208 can also be determined from the website 102. The website 102, or at least a portion of the website 102, can be analyzed for information relating to the users who claim affiliation with the website 102. For example, mysite.example.com can include blog entries authored by Jane 108. Thus, if Jane Smith's name is found on the website 102, the validity metrics 208 may reflect a greater likelihood that Jane's affiliation claim is valid. The analysis of the website 102 can be of a portion of the website 102, for example, the content found at mysite.example.com, rather than the entirety of example.com. Alternatively or additionally, the entire website 102 can be analyzed for validity metrics. The validity metrics 208 can also provide a measure of the number of times information relating to the user is found on the website 102.

The analyzer 202 includes a score generator 212 that generates validity scores 214, 216 based on other validity metrics, e.g., the validity metrics 204, 206, 208. The validity scores can be a weighted sum, or some other combination of the validity metrics. For example, John's validity score 214 can be a weighted sum or average of the validity metrics 204 from John's profile 106 and the validity metrics 208 from the website 102 with regard to John 104. Similarly, Jane's validity score 216 can be a weighted sum or average of the validity metrics 206 from Jane's profile 110 and the validity metrics 208 from the website 102 with regard to Jane 108.

The analyzer 202 includes a score comparator 218, which compares the validity scores 214, 216. Based on the validity scores 214, 216, the score comparator 218 can determine whether the claimed affiliations are valid. In this example, the score comparator 218 determines that John's affiliation is not valid 220, while Jane's association is valid 222. For example, the comparator 218 can determine that the higher score is valid, while the lower score is not. In some implementations, a predetermined threshold can be used to determine validity of affiliations. In some implementations, multiple users can be determined to have valid affiliations to a same website.

In some implementations, users determined to have a valid website affiliation can be provided an indication of an increased likelihood that the user is trustworthy. In some implementations, determining valid affiliations can be used for spam detection. In some implementations, valid affiliations can be used for modifying an affinity between users. For example, two users who have valid affiliations with a same website may be more likely to be presented content produced by each other. Alternatively or additionally, users who are affiliated with the same website may be more likely to know each other. For a user who is affiliated with a website, other users, who are affiliated with that website, may be selected as good candidates to be added to contact lists or friend lists of the user. In some implementations, invalid affiliations can be indicated as invalid to reduce misleading information.

Figure 3:
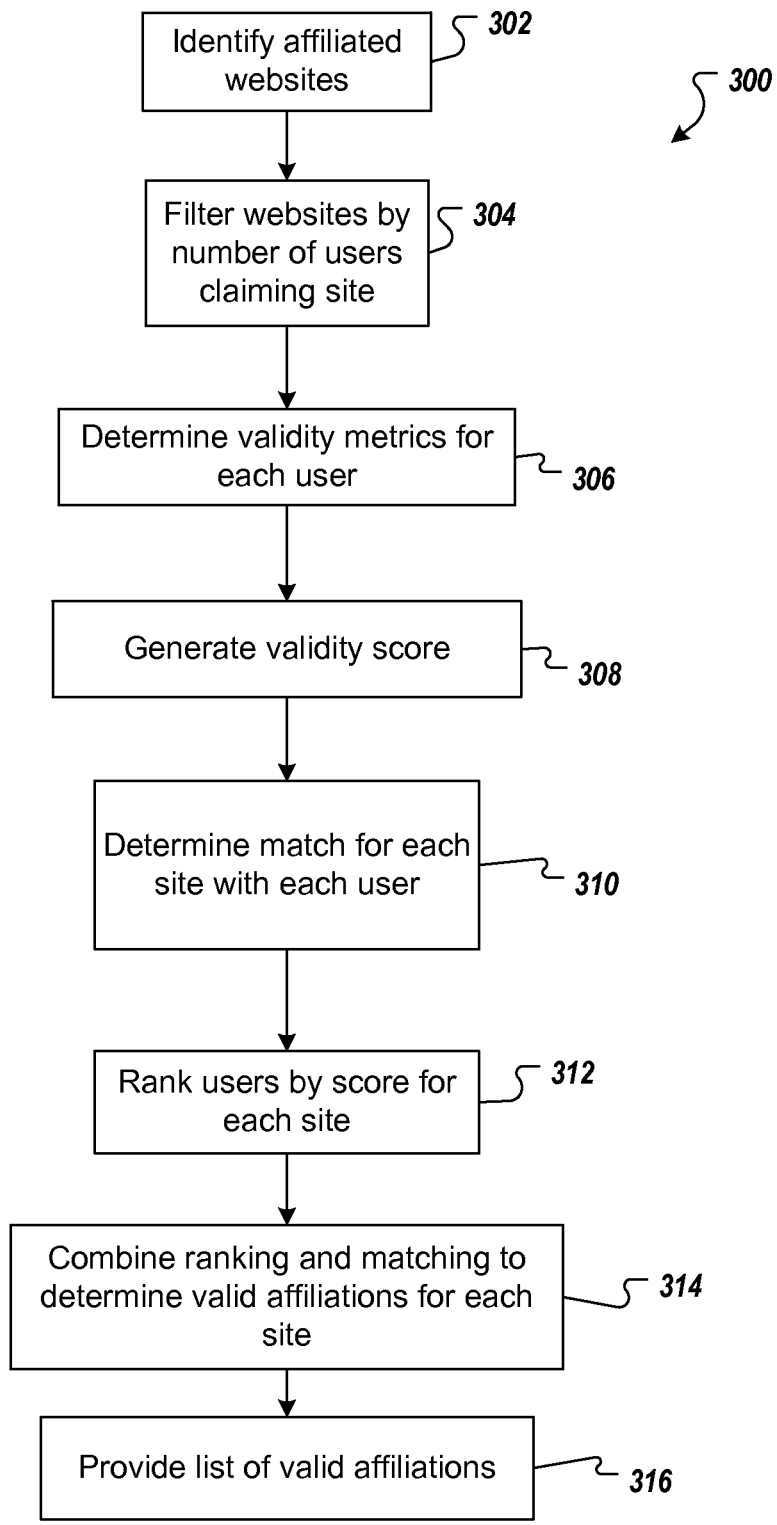
FIG. 3 is a flowchart of example operations for analyzing websites represented on user profiles.

FIG. 3 is a flowchart of example operations for analyzing websites represented on user profiles. Referring to FIG. 3, a flowchart 300 represents operations of a computing device, for example, the server 200, to analyze websites represented on user profiles. Such operations are typically executed by components (e.g., one or more processors) included in a computing device or multiple computing devices. In some implementations, operations execution may be distributed among two or more locations.

Operations of the computer device may include identifying affiliated websites (302). Affiliated websites can include the websites to which users of a social networking service claim some affiliation. The claims of affiliation can be determined as described above, for example, including a website URL on a profile page.

Operations can also include filtering websites by a number of users claiming each website (304). If the number of users claiming affiliation with a website is less than a first predefined threshold, then the operations can include concluding that the claimed affiliations are valid for the website. If the number of users claiming affiliation with the website is greater than a second predetermined threshold, then the operations can include concluding that none of the claimed affiliations are valid for the website. For example, if only one or two users claim affiliation to a specific website, it can be concluded that the claim or claims are valid. Thus, an example first threshold can be three. On the other hand, some websites that have many claims of affiliation may be too general to assign a meaningful valid association with particular users. Thus, an example second threshold can be a relatively large number, for example a hundred or a thousand.

For the unfiltered remaining websites with claims of affiliation between or equal to the first and second thresholds, operations can include determining validity metrics for each user claiming an affiliation with the website. (306). As described above, validity metrics can include, among other things, a number of times the user mentions the website or links to the website, a user quality score, and information relating to the user found on the website. These and other metrics can be determined for each user claiming affiliation to the website. Operations can also include generating validity scores (308) for each user claiming an affiliation with the website. As described above, the validity score can be based on the validity metrics.

Operations can also include determining a matching for each site with a claiming user (310). This step can include, for example, listing users who claim affiliations to websites and listing websites that are claimed as affiliated by users. The operations can also include generating a matching between the users and the websites based on the validity scores. For example, referring briefly to FIG. 4, a first user 406, claims two websites, Website 402 and Website 404. FIGS. 4A-D are examples of analyzing websites represented on user profiles. User 406's validity scores are 99 for the first website, Website 402 and 97 for the second website, Website 404. Website 402 can have a second user 408, claiming Website 402, with a validity score of 96. The second website, Website 404, can have a third user 410, claiming Website 404, with a validity score of 32. Looking at each site individually, as in FIG. 4A, it may be legitimate to conclude, as shown in FIG. 4B, that User 406's affiliation claim or both User 406 and User 408's claims to Website 402 as valid. Another conclusion may as well be that User 406's affiliation claim to Website 404 is also valid. Thus, User 406 would have valid claims to Website 402 and Website 404, User 408 would have a valid claim to Website 402, and User 410 would have no valid claims. However, with a matching technique, as in FIG. 4C to FIG. 4D, if the matching technique is a one-to-one matching technique, Website 402 may be matched with User 408, and Website 404 matched with User 406. The matching technique can produce this result because if Website 402 were matched with User 406, Website 404 would then have to be matched with User 410. However, the discrepancy between User 410's validity score and User 408's validity score might satisfy a threshold amount to make matching User 406 with Website 404 and User 408 with Website 402 a more optimal matching. For example, for website 402, the difference between the largest validity score (99) and the second largest validity score (97) is 2. For the website 404, the difference between the largest validity score (96) and the second largest validity score (32) is 64. Consequently, the matching technique will prefer to match user 406 with website 404. In some implementations, the matching technique calculates the one-to-one matching by applying a conventional maximum weighted matching algorithm to the validity scores to arrive at an optimal match. Thus, User 406 would have a valid claim to Website 404 and User 408 a valid claim to Website 402 in the matching technique, even though User 406 has a higher validity score for Website 402 than User 408.

In some implementations, the matching can include a stable matching technique, such that once users and websites are matched there would be no possible matches where both the user and the website would have a more valid match. In some implementations, the technique can be relaxed to include at most k people, where k is a predetermined threshold.

In some implementations, a site quality score is also generated based on a popularity or a reputation of the site. The site quality score can be analogous to the user quality score. In some implementations, the matching technique can include requiring the user quality score to be within a threshold amount of the site quality score. For example, a website (e.g., whitehouse.gov) can have a site quality score indicating a more reputable site, for which a user quality score of someone (e.g., the President of the United States) might qualify, but a random user may not.

Referring back to FIG. 3, operations can include ranking, for each website, users who claim an affiliation with the website (312). The users can be ranked according to their respective validity scores. The ranking of users claiming each website can be done with respect to each website individually. In some implementations, the example described above with respect to FIG. 4A can be a result of an example ranking technique.

Operations can also include combining the rankings for each site and the matching to determine valid affiliations for each website (314). The combining can be a weighted combination of the ranking and the matching. Operations can include providing a list of the valid affiliations (316). Ultimately each determination can be between valid or not valid, and thus the combined score distribution for each site can determine the threshold for each website. For example, a website can have combined validity scores for three users of 98, 97, and 42, respectively. In such an instance, the first two users may be considered valid affiliates, while the third is not.

Figure 5:
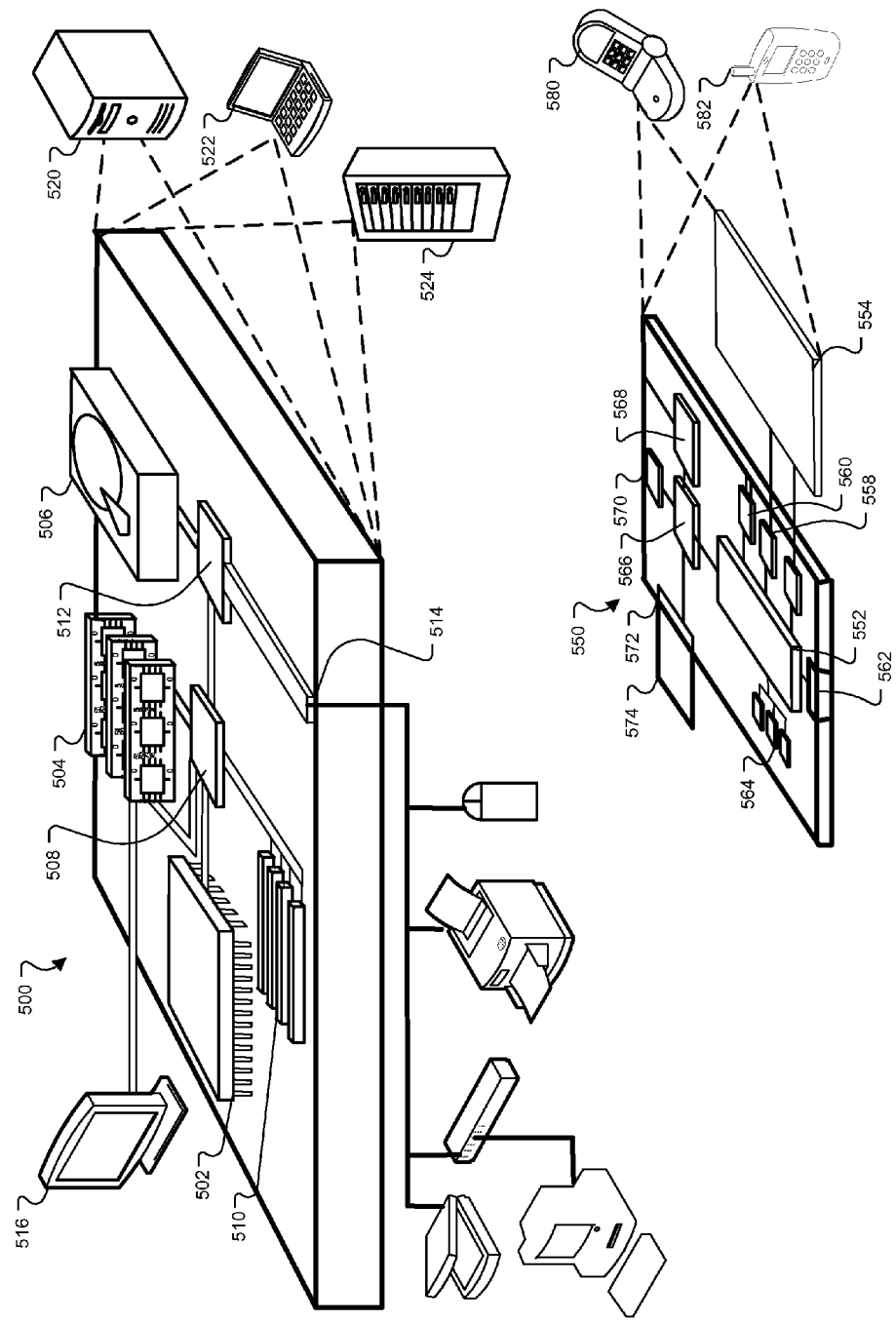
FIG. 5 shows an example of a computer device and a mobile computing device that can be used to implement the processes described herein.

FIG. 5 shows an example of a computer device and a mobile computing device that can be used to implement the processes describe herein. FIG. 5 shows an example of a generic computer device 500 and a generic mobile computer device 550, which may be used to implement the processes described herein, including process 300 and the various processing performed by the components shown in FIG. 5 (e.g., the servers, clients, mobile communication devices, and others). Computing device 500 is intended to represent various forms of digital computers, for example laptops, desktops, workstations, personal digital assistants, servers, blade servers, mainframes, and other appropriate computers. Computing device 550 is intended to represent various forms of mobile devices, for example personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, for example display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, for example a magnetic or optical disk.

The storage device 506 is capable of providing mass storage for the computing device 500. In one implementation, the storage device 506 may be or contain a computer-readable medium, for example a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, for example those described above. The information carrier may be a non-transitory computer- or machine-readable medium, for example the memory 504, the storage device 506, memory on processor 502, or the like. For example, the information carrier may be a non-transitory, machine-readable storage medium.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, for example a keyboard, a pointing device, a scanner, or a networking device for example a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer for example a laptop computer 522. Alternatively, components from computing device 500 may be combined with other components in a mobile device (not shown), for example device 550. Each of such devices may contain one or more of computing device 500, 550, and an entire system may be made up of multiple computing devices 500, 550 communicating with each other.

Computing device 550 includes a processor 552, memory 564, an input/output device, for example a display 554, a communication interface 566, and a transceiver 568, among other components. The device 550 may also be provided with a storage device, for example a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, for example control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, for example placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, for example those described above. The information carrier is a computer- or machine-readable medium, for example the memory 564, expansion memory 574 or memory on processor 552.

Device 550 may communicate wirelessly through communication interface 566, which may include digital signal processing circuitry where necessary. Communication interface 566 may provide for communications under various modes or protocols, for example GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, for example using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, for example through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method performed by one or more processing devices, the method comprising:
    identifying online resources with which users of a social networking service have established an affiliation;
    identifying a subset of the online resources in which a count of users who have established an affiliation with the online resource exceeds a threshold;
    producing a list of valid affiliations for each online resource of the subset of online resources, comprising:
        generating a validity score for each of the established affiliations with the respective online resource,
        determining whether each of the established affiliations with the respective online resource is valid based on the corresponding validity score, and
        identifying a subset of the users who established valid affiliations with the respective online resource based on the corresponding validity scores; and
    providing the list of the valid affiliations based on the identified subset of users.

2. The method of claim 1, wherein identifying the online resources comprises identifying a link to an online resource on a profile of a user of the social networking service.

3. The method of claim 1, wherein identifying the online resources comprises identifying a link to an online resource on posts generated by a user of the social networking service.

4. The method of claim 1, wherein identifying the online resources comprises identifying, on at least a portion of an online resource, information relating to a user of the social networking service.

5. The method of claim 1, wherein generating the validity score comprises determining a number of times a respective user links to the respective online resource on a profile of the respective user.

6. The method of claim 1, wherein generating the validity score comprises determining a number of times a respective user links to the respective online resource on posts generated by the respective user.

7. The method of claim 1, wherein generating the validity score comprises determining a ratio of a number of times a respective user links to the respective online resource compared to a number of times the respective user links to other online resources.

8. The method of claim 1, wherein generating the validity score comprises determining a user quality score, the user quality score based on a popularity of a corresponding user.

9. The method of claim 8, wherein generating the validity score comprises determining a site quality score.

10. The method of claim 9, wherein determining whether the affiliation is valid comprises determining whether the user quality score is within a threshold amount of the site quality score.

11. A system comprising:
one or more computers and one or more storage devices storing instructions that are operable, when executed by the one or more computers, to cause the one or more computers to perform operations comprising:
identifying online resources with which users of a social networking service have established an affiliation;
identifying a subset of the online resources in which a count of users who have established an affiliation with the online resource exceeds a threshold;
producing a list of valid affiliations for each online resource of the subset of online resources, comprising:
generating a validity score for each of the established affiliations with the respective online resource,
determining whether each of the established affiliations with the respective online resource is valid based on the corresponding validity score, and
identifying a subset of the users who established valid affiliations with the respective online resource based on the corresponding validity scores; and
providing the list of the valid affiliations based on the identified subset of users.

12. The system of claim 11, wherein identifying the online resources comprises identifying a link to an online resource on a profile of a user of the social networking service.

13. The system of claim 11, wherein identifying the online resources comprises identifying a link to an online resource on posts generated by a user of the social networking service.

14. The system of claim 11, wherein identifying the online resources comprises identifying, on at least a portion of an online resource, information relating to a user of the social networking service.

15. The system of claim 11, wherein generating the validity score comprises determining a number of times a respective user links to the respective online resource on a profile of the respective user.

16. The system of claim 11, wherein generating the validity score comprises determining a number of times a respective user links to the respective online resource on posts generated by the respective user.

17. The system of claim 11, wherein generating the validity score comprises determining a ratio of a number of times a respective user links to the respective online resource compared to a number of times the respective user links to other online resources.

18. The system of claim 11, wherein generating the validity score comprises determining a user quality score, the user quality score based on a popularity of a corresponding user.

19. A non-transitory computer-readable medium encoded with computer program instructions that when executed by one or more computers cause the one or more computers to perform operations comprising:
identifying online resources with which users of a social networking service have established an affiliation;
identifying a subset of the online resources in which a count of users who have established an affiliation with the online resource exceeds a threshold;
producing a list of valid affiliations for each online resource of the subset of online resources, comprising:
generating a validity score for each of the established affiliations with the respective online resource,
determining whether each of the established affiliations with the respective online resource is valid based on the corresponding validity score, and
identifying a subset of the users who established valid affiliations with the respective online resource based on the corresponding validity scores; and
providing the list of the valid affiliations based on the identified subset of users.

20. The computer-readable medium of claim 19, wherein identifying the online resources comprises identifying a link to an online resource on a profile of a user of the social networking service.

* * * * *